United States Patent [19]
Ingram et al.

[11] Patent Number: 6,090,502
[45] Date of Patent: Jul. 18, 2000

[54] EXTERNAL PACKAGE FOR A BATTERY

[75] Inventors: Jerry W. Ingram, Cicero; Randall F. Brantley, Indianapolis, both of Ind.

[73] Assignee: Delphi Technologies, Inc., Troy, Mich.

[21] Appl. No.: 09/439,567

[22] Filed: Nov. 12, 1999

[51] Int. Cl.[7] .............................. H01M 2/04; H01M 2/30
[52] U.S. Cl. ........................... 429/65; 429/121; 429/178; 174/138 F
[58] Field of Search .............................. 429/65, 121, 177, 429/178, 181; 174/138 F

[56] References Cited

U.S. PATENT DOCUMENTS

| | | | |
|---|---|---|---|
| 4,064,328 | 12/1977 | Allen | 429/121 |
| 4,562,125 | 12/1985 | Daws | 429/65 |
| 5,663,009 | 9/1997 | Stocchiero | 429/65 |
| 5,804,770 | 9/1998 | Tanaka | 429/65 X |

*Primary Examiner*—John S. Maples
*Attorney, Agent, or Firm*—Margaret A. Dobrowitsky

[57] ABSTRACT

The present invention provides an external battery package unit (10) which houses mechanical and electrical components (32, 34) intended to be electrically connected to a battery (20) and be conveniently mounted to a top surface (22) of the battery (20). The battery unit (10) is made to fit within existing battery size constraints. In an exemplary embodiment, the external battery package unit (10) comprises a first housing (32) which acts as a mechanical compartment and a second housing (34) which acts as an electronics compartment. The first and second housings (32, 34) are secured to one another by a mounting member (30) which adjustably receives a portion of the first and second housings (32, 34) so that a distance between ends of the first and second housings (32, 34) is variable and the relationship between the first and second housings (32, 34) may be adjusted according to external parameters, such as the size of the battery (20) and different tolerances between battery post terminals.

11 Claims, 1 Drawing Sheet

EXTERNAL PACKAGE FOR A BATTERY

TECHNICAL FIELD

The present invention relates generally to electrical storage batteries and more particularly, to an external package which is designed to mount on batteries having varying sizes.

BACKGROUND OF THE INVENTION

One common type of storage battery comprises a top terminal post design battery which typically includes a pair of terminal posts extending from a top surface of the battery. In batteries having top terminal posts, the terminal posts are made of a conductive material, e.g., a lead alloy material, with a cylindrical or frusto-conical shape. An electrical connection is typically made between the top terminal posts of the battery and an electrical conduit by a terminal post connector.

A variety of types of terminal post connectors are available to connect the electrical conduit to the battery in automotive type applications. Some of these include a conventional connector comprising a molded, generally U-shaped device with a bolt passing through the outwardly projecting yoke-like arms for securely clamping the connector to the battery post. Such connectors are usually die cast from lead or brass-lead alloy or other materials such as zinc alloy or copper alloy. Because of the bulky nature of these terminal post connectors, the top surface of the battery is further limited in terms of having available space for mounting at least one battery component or unit thereto.

As batteries become more advanced and continue to offer additional features to the consumer, manufacturers are investigating and are currently using battery units which are designed to operate by drawing power from the battery itself. These units are ideally located proximate the battery itself and more preferably would be attached to the terminal posts and be disposed on the top surface of the battery. In addition, manufacturers are investigating using electronic battery units which offer the consumer a number of safety and performance features. Such an electronics unit would be electrically connected to the battery and thus it would be advantageous to mount the electronics unit directly on the battery itself. As batteries become more and more advanced and continue to offer more functions and added performance, it is increasingly more important to use such external battery units.

Because of a considerable tolerance between battery posts of conventional batteries, it is very difficult to mount any type of unit directly to one or more of the top terminal posts of the battery. In other words the distance between the terminal posts themselves can vary from one battery to another and the location on the top surface of the battery where the terminal posts are formed may also vary from one battery to another. These tolerances between battery posts present difficulties for the manufacturer of a battery unit which is to be electrically connected to the terminal posts of the battery. Consequently, the battery units have commonly been mounted external to the battery, that is in a remote location proximate the battery, and then electrically connected to one or more of the terminal posts by using an electrical cable assembly and any necessary terminal connectors which provide the electrical connection between the terminal posts and the battery unit. The use of cabling and terminal connectors to remotely mount the battery unit takes up additional space in the compartment in which the battery is located and also adds complexity and increases costs for the overall mounting process.

Accordingly, there is a perceived need for the development of an external package unit which is intended to house mechanical and electrical components and be easily mounted to the top of the battery and also accommodate existing tolerances between the battery terminal posts.

SUMMARY OF THE INVENTION

The present invention comprises an external battery package unit which houses mechanical and electrical components intended to be electrically connected to a battery and be conveniently mounted to a top surface of the battery. The battery unit is made to fit within existing battery size constraints.

In an exemplary embodiment, the external battery package unit comprises a first housing which acts as a mechanical compartment and a second housing which acts as an electronics compartment. The first and second housings are secured to one another by a mounting member which adjustably receives a portion of the first and second housings so that a distance between ends of the first and second housings is variable and the spatial relationship between the first and second housings may be adjusted according to external parameters, such as the size of the battery and different tolerances between battery post terminals.

More specifically, each of the first and second housings includes a leg portion which when coupled to one another serves as a bridge between the two components and permits electrical wiring and the like to be routed therebetween. A mounting member acts to receive and adjustably retain the first and second housings relative to one another. The first and second housings also each include a terminal cover portion which is disposed over a respective post terminal extending outwardly from the top surface of the battery so as to protectively enclose the post terminal. Electromechanical components within the first housing are electrically connected to the enclosed post terminal which preferably comprises a positive terminal of the battery. Electronics within the other compartment are electrically connected to the positive terminal enclosed within the first housing and are also grounded to the negative terminal of the battery, which is enclosed within the second housing.

Advantageously, the first and second housings each provide a substitute post terminal extending from the respective housing. The substitute post terminals provide the consumer with a useable post terminal connected to one of the positive and negative terminals of the battery. In other words, both substitute positive and negative terminals are provided by the external battery package unit of the present invention.

The external battery package unit is intended to be simple in design and in terms of mounting or removing the unit from the top surface of the battery. Furthermore, the low profile of the external battery package unit permits mounting thereof within the existing battery envelope. In contrast to conventional battery packages, which need to be mounted remote from the battery, the external battery package unit of the present invention is directly mounted on the top surface of the battery. Furthermore, because of the adjustable nature of the unit, the unit's overall size may be easily adjusted so that the unit easily accommodates various battery sizes and tolerances.

The above-described and other features and advantages of the present invention will be appreciated and understood by those skilled in the art from the following detailed description, drawings, and appended claims.

BRIEF DESCRIPTION OF THE DRAWINGS

Referring now to the drawings wherein like elements are numbered alike in the several Figures.

DETAILED DESCRIPTION OF THE PREFERRED EMBODIMENT

Figure 1:
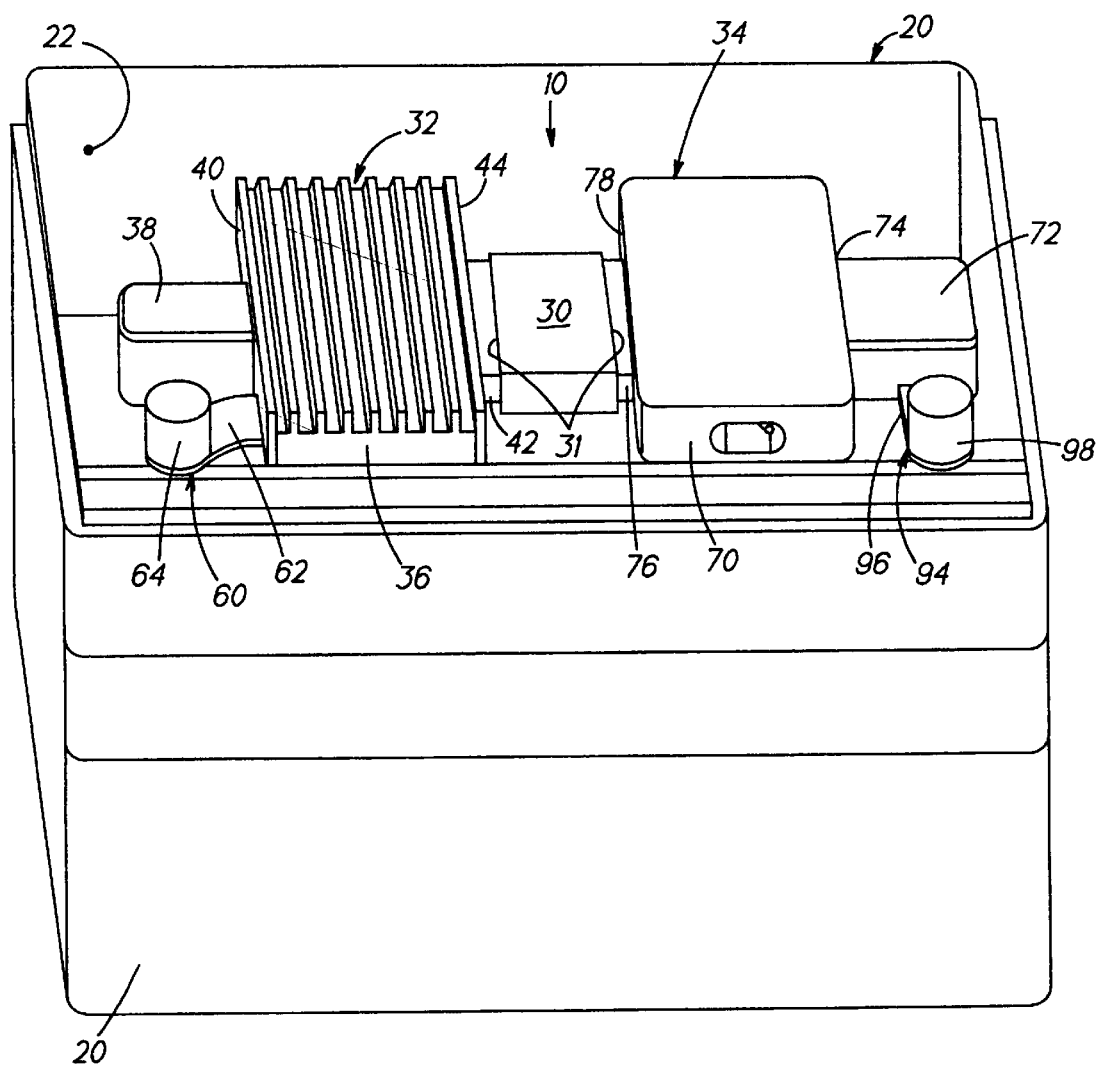
FIG. 1 is a perspective view showing an external battery package unit in accordance with the present invention mounted to a battery.
Figure 2:
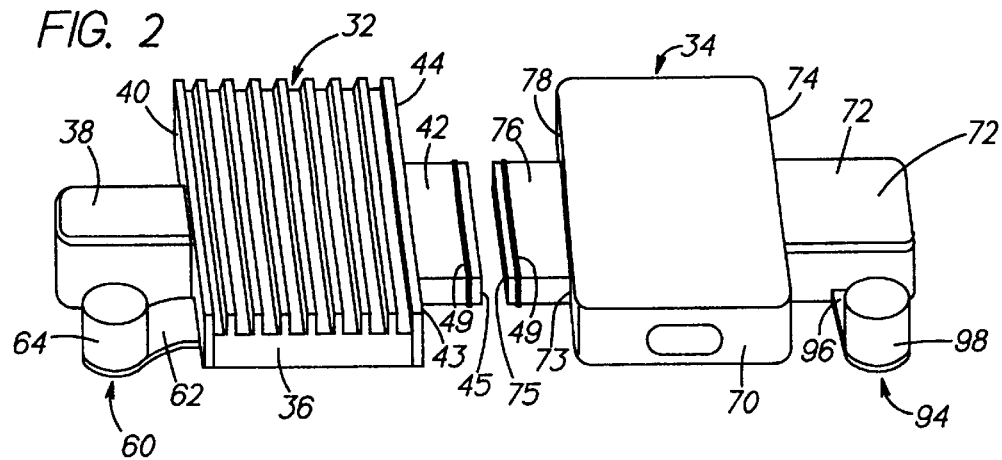
FIG. 2 is an exploded perspective view of the unit of FIG. 1 illustrating a two housing external battery package unit according to the present invention.

Referring to FIGS. 1 and 2, an exemplary embodiment of an external battery package unit according to the present invention is generally designated by reference numeral 10. FIG. 1 is a perspective view of a battery 20 having a pair of terminal posts (not shown). Battery 20 includes a top surface 22 which is generally planar. As is known in the art, the distance between the terminal posts varies according to the size of the battery and batteries typically come in various sizes, such as 9 inch or 10 inch. Even within the same size application, e.g., 9 inch, there may be significant tolerance between the terminal posts which, until the present invention, has made the mounting of battery packages directly to top surface 22 a very difficult task because the battery packages needed to be electrically connected to the terminal posts and thus could not accommodate tolerances between the terminal posts.

External battery package unit 10 is electrically connected to the terminal posts (positive and negative) as will be described in greater detail hereinafter. External battery package unit 10 includes a first housing 32 and a second housing 34 which are adjustably coupled to one another by a flexible slide mounting member 30. A preferred flexible slide mounting member 30 is disclosed in a commonly assigned U.S. patent application Ser. No. 09/455,138 entitled "Flexible Battery Mounting" (Attorney Docket DP-300145), which is hereby incorporated by reference in its entirety. It being understood that other flexible slide mounting members 30 which serve to adjustably couple the first and second housings 32 and 34 together may be used with external battery package unit 10 of the present invention.

In an exemplary embodiment, external battery package unit 10 comprises an electronics package and first housing 32 includes a mechanical compartment and second housing 34 includes an electronics compartment. First housing 32 includes a generally rectangular base compartment 36 having a first terminal cover member 38 which extends outwardly from one side 40 of base compartment 36 and a side mount fitting 42 extending outwardly from an opposing other side 44 of base compartment 36 towards second housing 34.

Base compartment 36 comprises a housing in which mechanical components of external battery package unit 10 are disposed therein. First terminal cover member 38 comprises a generally U-shaped housing in the form of a leg extending from base compartment 36. First terminal cover member 38 is sized to be disposed on top of a first terminal post (not shown) of the battery to effectively cover the first terminal post to prevent a misconnection. Preferably, the first terminal post comprises a positive terminal of battery 20. In a preferred embodiment, first terminal cover member 38 is integrally formed with base compartment 36. First terminal cover member 38 is intended to fully encase the first terminal post so that a consumer does not attempt to make an electrical connection between the first terminal post and another electrical conduit.

The mechanical components disposed within first housing 32 typically include one or more bus bar assemblies and/or electrical switching devices. In order to electrically connect the mechanical components to the first terminal post, a terminal post connector (not shown) is used. Any number of suitable terminal post connectors may be used so long as the terminal post connector is designed so that an electrical connection is formed with the first terminal post and an electrical distribution system, e.g., bus bar assembly, may be attached to the first terminal post connector to thus provide power from the first terminal post to the electrical distribution system. One preferred terminal post connector is disclosed in a commonly assigned U.S. application Ser. No. 09/447,649 entitled "Battery Terminal Post Connector" (Attorney Docket DP-300144), which is hereby incorporated by reference in its entirety.

Side mount fitting 42 is in the form of an elongated member having an opening extending therethrough so that one end 43 of side mount fitting 42 is integral with base compartment 36 and forms an entrance into a cavity formed within base compartment 36. An opposite end 45 of side mount fitting 42 comprises an open end which permits electrical wiring and the like to be routed between first housing 32 and second housing 34. In the illustrated embodiment, side mount fitting 42 comprises a member having a generally rectangular cross-section of sufficient width and height so that electrical wires and the like may be routed through the generally rectangular opening. At the opposite end 45, side mount fitting 42 preferably includes a grommet-type sealing member 49 which extends around a peripheral edge at the opposite end 45. Grommet-type sealing member 49 is formed of a suitable material, e.g., rubber, and is secured within a retaining groove formed in an outer surface of side mount fitting 42.

A substitute first terminal post 60 is provided and electrically connected to the electromechanical components disposed within base compartment 36 and accordingly is electrically connected to the first terminal post of battery 20. As shown, substitute first terminal post 60 includes a tong 62 (conductive plate) which is electrically connected to and extends from the electromechanical components disposed within first housing 32. At one end of tong 62 is a substitute terminal post 64, extending upwardly therefrom, which is designed to provide the consumer with a useable terminal post connected to a lead (e.g., the positive first terminal post) of battery 20. Preferably, a sufficient portion of substitute first terminal post 60 is disposed on top surface 22 of battery 20 to enable substitute first terminal post 60 to be supported by top surface 22 and permit the consumer to clamp an object with force to substitute first terminal post 60.

In the exemplary embodiment, second housing 34 is similar to first housing 32; however it is within the scope of the present invention that second housing 34 may be different than first housing 32 so long as both housings 32 and 34 are capable of being coupled to one another by the flexible slide mounting member 30 of the present invention. In the illustrated embodiment, second housing 34 includes a generally rectangular base compartment 70 having a second terminal cover member 72 which extends outwardly from one side 74 of base compartment 70 and a side mount fitting 76 extending outwardly from an opposing second side 78 of base compartment 70 towards first housing 32. Base compartment 70 comprises a housing in which electrical components of external battery package unit 10 are preferably disposed and typically includes a circuit board (not shown) and the like. Preferably, the electronic components disposed within second housing 34 include one or more electronic modules (not shown). It being understood that first housing 32 and second housing 34 may include either electronic components or mechanical components or a combination thereof and the present invention is not limited to the exemplary embodiment shown herein.

Second terminal cover member 72 comprises a generally U-shaped housing in the form of a leg extending from base compartment 70. Second terminal cover member 72 is sized to encase a second terminal post (not shown) of battery 20. Preferably, the second terminal post comprises a negative terminal of battery 20. In a preferred embodiment, second terminal cover member 72 is integrally formed with base compartment 70. Second terminal cover member 72 is intended to fully encase the second terminal post to prevent the consumer from having access thereto and attempting to the second terminal post for an electrical connection. The electronics within base compartment 70 are grounded to the second terminal post by grounding a wire (not shown) from the circuit board to the second terminal post, wherein the wire is preferably routed within second terminal cover member 72 to the second terminal post which is disposed there underneath. The electronics are also electrically connected to the first post terminal in order for the electronics to be properly powered for operation. An electrical connection from the electronics to the electromechanical components disposed within first housing 32 may be made by electrical distribution members, such as electrical wires, bus bar assemblies, and the like.

Side mount fitting 76 of second housing 34 is essentially identical to side mount fitting 42 of first housing 32 and comprises an elongated member having an opening extending therethrough so that one end 73 of side mount fitting 76 is integral with base compartment 70 and forms an entrance into a cavity formed within base compartment 70. An opposite end 75 of side mount fitting 76 is open-ended and is designed to permit electrical wiring and the like to travel between first housing 32 and second housing 34. The electrical wires provide power from the first terminal post (positive terminal) to the electrical components, e.g., circuit board, disposed in second housing 34 via the electromechanical components disposed within base compartment 36. Like side mount fitting 42, side mount fitting 76 has a generally rectangular cross-section. The opposite end 75, side mount fitting 76 preferably includes grommet-type sealing member 49 which extends around a peripheral edge of side mount fitting 76.

A substitute second terminal post 94 is provided and electrically connected to the electrical components disposed within base compartment 70. As shown, substitute second terminal post 94 includes a tong 96 (conductive plate) which extends from the first side cover member 38. At one end of tong 96 is a substitute terminal post 98 which is designed to provide to the consumer a useable post terminal connected to the negative lead of battery 20. Preferably, a sufficient portion of substitute second terminal post 94 is disposed on top surface 22 of battery 20 to permit the consumer to clamp an object with some force to substitute second terminal post 94.

Accordingly, flexible slide mounting member 30 is designed to provide adjustment of first and second housings 32 and 34 relative to the terminal posts of battery 20 by permitting first and second housing 32 and 34 to be positionable within flexible slide mounting member 30 so that a predetermined length of side mount fittings 42 and 76 extends from the ends 31 of flexible slide mounting member 30. Flexible slide mounting member 30 is adjustably secured to both side mount fittings 42 and 76 by retaining methods known in the art, e.g., the use of complimentary interlocking members. Flexible slide mounting member 30 provides adjustment not only for the large variation in terminal post location but also for a range of battery sizes. In other words, the use of flexible slide mounting member 30 permits external battery package unit 10 to be used with varying sized batteries, e.g., 8, 9, or 10 inch sizes, and the mounting of external battery package unit 10 to the terminal posts of battery 20 is not substantially dependent upon the location of the terminal posts or the considerable tolerances which may exist between terminal posts.

External battery package unit 10 including flexible slide mounting member 30 accommodates different sized batteries 20 by permitting one or more of first and second housings 32 and 34 to be properly positioned relative to flexible slide mounting member 30 by either extending the respective housing outward in a direction away from flexible slide mounting member 30 or inwardly retracting the respective housing within a cavity of flexible slide mounting member 30 to thereby reduce the length of the respective side mount fitting which extends from one end of flexible slide mounting member 30.

To generally assemble the unit of the present invention, side mount fittings 42 and 76 are inserted into the cavity formed in flexible slide mounting member 30, whereby the retaining members of each component cause side mount fittings 42 and 76 to be adjustably secured within flexible slide mounting member 30. To reduce the overall length of external battery package unit 10 as measured from the ends of first and second terminal cover members 38 and 72, at least one of side mount fittings 42 and 76 is inwardly directed within flexible slide mounting member 30 and is securely coupled thereto. Accordingly, depending upon the size of battery 20 and the distance between the first and second post terminals, the overall length of external battery package unit 10 is adjusted so that the external battery package unit 10 properly fits on top surface 22 and mounts to the first and second post terminals. Flexible slide mounting member 30 enables for packaging 10 that is a "one size fits all" and accordingly, such a design minimizes proliferation.

Once flexible slide mounting member 30 is properly positioned relative to side mount fittings 42 and 76, flexible slide mounting member 30 may be further coupled to slide mount fittings 42 and 76 by using a fastener assembly (not shown). For example, a fastener, such as a bolt, may be disposed through a portion of flexible slide mounting member 30 and side mount fittings 42 and 76, wherein the fastener threadingly engages a nut or the like on the opposite side of the flexible slide mounting member 30 resulting in the flexible slide mounting member 30 and side mount fittings 42 and 76 be secured to one another.

External battery package unit 10 is intended to be simple in design and in terms of mounting or removing the unit from top surface 22 of battery 20. Furthermore, the low profile of external battery package unit 10 permits mounting thereof within the existing battery envelope. In contrast to conventional battery packages, which need to be mounted remote from the battery, external battery package unit 10 is directly mounted on top surface 22 of battery 20. Moreover, external battery package unit 10 may be used with most existing hold downs, including a center cross over strap, which are used in battery assemblies; and therefore external battery package unit 10 accommodates and is complementary to existing battery hardware. External battery package unit 10 is formed of any suitable material and preferably is formed of an electrically insulating material, such as a plastic.

The electrical and mechanical-electrical components typically disposed within external battery package unit 10 are directly powered by the terminal connectors of the battery in such a manner that these components are conveniently disposed within a protective housing assemblies 32, 34 which electrically isolate the components from the surrounding environment, while still providing substitute positive and negative terminals for use by the consumer. In other words, positive and negative electrical clamping surfaces are provided for use by the consumer.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A battery package unit (10) for mounting on a top surface (22) of a battery (20) having first and second terminals extending therefrom, comprising:

a first housing (32) including a first portion (38) for enclosing the first terminal of the battery;

a first substitute terminal post member (60) extending from the first housing (32) and electrically connected to the first terminal of the battery (20);

a second housing (34) including a first portion for enclosing the second terminal of the battery (20);

a second substitute terminal post member (94) extending from the second housing (34) and electrically connected to the second terminal of the battery (20); and a mounting member (30) adjustably receiving and retaining the first and second housings (32, 36) so that a distance between ends of the first and second housings (32, 34) is variable.

2. The battery package unit (10) as set forth in claim 1, wherein the first housing includes a mechanical compartment (36) having at least one mechanical component disposed therein and electrically connected to the first terminal.

3. The battery package unit (10) as set forth in claim 1, wherein the second housing (34) includes an electronics compartment (70) having at least one electronics module disposed therein and electrically connected to the first and second terminals.

4. The battery package unit (10) as set forth in claim 1, wherein the first terminal comprises a positive terminal and the second terminal comprises a negative terminal.

5. The battery package unit (10) as set forth in claim 1, wherein the first housing (32) includes a first side mount fitting (42) extending outwardly from a first base compartment (36) of the first housing (32), the first side mount fitting (42) being adjustably retained within a cavity formed in the mounting member (30).

6. The battery package unit (10) as set forth in claim 1, wherein the second housing (34) includes a second side mount fitting (76) extending outwardly from a second base compartment (70) of the second housing (34), the second side mount fitting (76) being adjustably retained within a cavity formed in the mounting member (30).

7. The battery package unit (10) as set forth in claim 1, wherein the portion of the first housing (32) which encloses the first terminal comprises a first terminal cover member (38) extending outwardly from a first base compartment (36) of the first housing (32), the portion of the second housing (34) which encloses the second terminal comprising a second terminal cover member (72) extending outwardly from a second base compartment (70) of the second housing (34).

8. The battery package unit (10) as set forth in claim 7, wherein the first and second terminal cover members (38, 72) are integral to the first and second base compartments (36, 70) and comprise generally U-shaped members.

9. The battery package unit (10) as set forth in claim 7, wherein the first and second base compartments (36, 70) have a generally square configuration.

10. The battery package unit (10) as set forth in claim 1, wherein the first substitute terminal post member (60) comprises:

a first conductive plate (62) electrically connected to the first terminal enclosed within the first housing (32); and a first post (64) extending upwardly from the first conductive plate (62), the first post (64) providing a first electrical clamping surface; and wherein the second substitute post terminal member (94) comprises a second conductive plate (96) electrically connected to the second terminal enclosed within the second housing (34); and a second post (98) extending upwardly from the second conductive plate (96), the second post providing a second electrical clamping surface.

11. The battery package unit as set forth in claim 1, wherein the mounting member (30) comprises an elongated member having a complementary cross section for receiving a portion of each of the first and second housings (32, 34) in an adjustably retainable manner.

* * * * *